United States Patent
Bangalore et al.

(10) Patent No.: US 6,415,248 B1
(45) Date of Patent: Jul. 2, 2002

(54) METHOD FOR BUILDING LINGUISTIC MODELS FROM A CORPUS

(75) Inventors: Srinivas Bangalore, Hackettstown; Giuseppe Riccardi, Hoboken, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/443,891

(22) Filed: Nov. 19, 1999

Related U.S. Application Data

(60) Provisional application No. 60/111,631, filed on Dec. 9, 1998.

(51) Int. Cl.[7] .......................... G06F 17/20; G10L 13/00
(52) U.S. Cl. ........................ 704/1; 704/257; 704/255
(58) Field of Search ........................... 704/1, 8–10, 255, 704/256, 257

(56) References Cited

U.S. PATENT DOCUMENTS

| | | | | |
|---|---|---|---|---|
| 5,839,106 A | * | 11/1998 | Bellegarda | 704/257 |
| 6,021,384 A | * | 2/2000 | Gorin et al. | 704/1 |
| 6,173,261 B1 | * | 1/2001 | Arai et al. | 704/257 |

OTHER PUBLICATIONS

McCandless et al, "Empirical Acquistion of Word and Phrase Classes in the ATIS Domain", Spoken Language Systems Group, Laboratory for Computer Science, Massachusetts Institute of Technology, Cambridge, Massachusetts.

Kneser et al, "Improved Clustering Techniques for Class-Based Statistical Language Modeling", Philips GmbH Forschungslaboratorien, Weisshausstrasse, 2, D–52066 Aachen, Germany.

Abella et al, "Generating Semantically Consistent Inputs to a Dialog Manager", At&T Labs Research, Florham Park, New Jersey.

Saul et al, "Aggregate and Mixed Order Markov Models for Statistical Language Processing", AT&T Labs—Research, Florham Park, New Jersey.

* cited by examiner

*Primary Examiner*—Patrick N. Edouard
(74) *Attorney, Agent, or Firm*—Kenyon & Kenyon

(57) ABSTRACT

A method iteratively integrates clustering techniques with phrase acquisition techniques to build complex linguistic models from a corpus. A set of features is initialized by the corpus. Thereafter, the method determines, according to a predetermined cost function, to process the features by one of phrase clustering processing or phrase grammar learning processing. If phrase clustering processing is performed, the method processes an interstitial set of features comprising both the old features and newly established clusters by phrase grammar learning processing. The features obtained as an output of phrase grammar learning is re-indexed as a set of features for a subsequent iteration. The method may be repeated over several iterations to build a hierarchical linguistic model.

28 Claims, 2 Drawing Sheets

METHOD FOR BUILDING LINGUISTIC MODELS FROM A CORPUS

RELATED APPLICATIONS

This application benefits from the priority of U.S. patent application Ser. No. 60/111,631, entitled "Automatic Acquisition of Phrase Grammars for Stochastic Language Modeling," filed Dec. 9, 1998.

BACKGROUND

The present invention relates to a method that builds phrase grammars from a corpus of speech, text, phonemes or any kind of symbolic input (herein "the corpus").

It has long been a goal of computing systems to interact with human users using natural language from the users. That is, rather than restricting the user to predetermined syntactic commands, it would be preferable to have the user express a command in the most natural way for the user and to have a computer comprehend the command. Although modern computing systems have improved remarkably in their ability to recognize spoken words, comprehension of speech still is limited because these system cannot ascribe meanings to the commands.

Significant advances have been made in the ability of modern computing systems to acquire phrases from a corpus. For example, acquisition techniques are disclosed in U.S. patent application Ser. No. 08/960,291, entitled "Automatic Generation of Superwords," filed Oct. 29, 1997. Other examples may be found in E. Giachin, "Phrase Bigram for Continuous Speech Recognition," Proc. ICASSP, pp. 225–228, (1995), K. Ries, et al., "Improved Language Modeling by Unsupervised Acquisition of Structure," Proc. ICASSP, pp. 193–196 (1995).

Additionally, advances have been made in the ability of such systems to classify words that possess similar lexical significance. The inventors, for example, have developed a clustering technique as disclosed in co-pending U.S. patent application Ser. No. 207,326 entitled "Automatic Clustering of Tokens from a Corpus of Speech," the disclosure of which is incorporated herein. Clustering processing also is disclosed in Kneser, et al., "Improved Clustering Techniques for Class-Based Statistical Language Modeling," Eurospeech (1993) and in McCandless, et al., "Empirical Acquisition of Word and Phrase Classes in the Atis Domain," Third European Conf. Speech Comm. Tech. (1993).

While phrase acquisition and clustering techniques improve the ability of a computing system to comprehend speech, neither technique alone can build a structure model from a corpus of speech or text. Accordingly, there is a need in the art for a method for building a linguistic model from a corpus of speech or text.

SUMMARY

The present invention provides a method that combines clustering techniques with phrase acquisition techniques with a closed-loop optimization method to build complex linguistic models from a corpus. A set of features is initialized by the corpus. Thereafter, the method determines, according to a predetermined cost function, to process the features by one of phrase clustering processing or phrase grammar learning processing. If phrase clustering processing is performed, the method processes an interstitial set of features comprising both the old features and newly established clusters by phrase grammar learning processing. The features obtained as an output of phrase grammar learning is re-indexed as a set of features for a subsequent iteration. The method may be repeated over several iterations to build a hierarchical linguistic model.

DETAILED DESCRIPTION

The present invention provides a method that combines clustering techniques with phrase acquisition techniques within a closed-loop optimization method to build complex linguistic models from a corpus. A set of features is initialized by the corpus. Thereafter, the method determines, according to a predetermined cost function, to process the features by one of phrase clustering processing or phrase grammar learning processing. If phrase clustering processing is performed, the method processes an interstitial set of features comprising both the old features and newly established clusters by phrase grammar learning processing. The features obtained as an output of phrase grammar learning is re-indexed as a set of features for a subsequent iteration. The method may be repeated over several iterations to build a hierarchical linguistic model.

Figure 1:
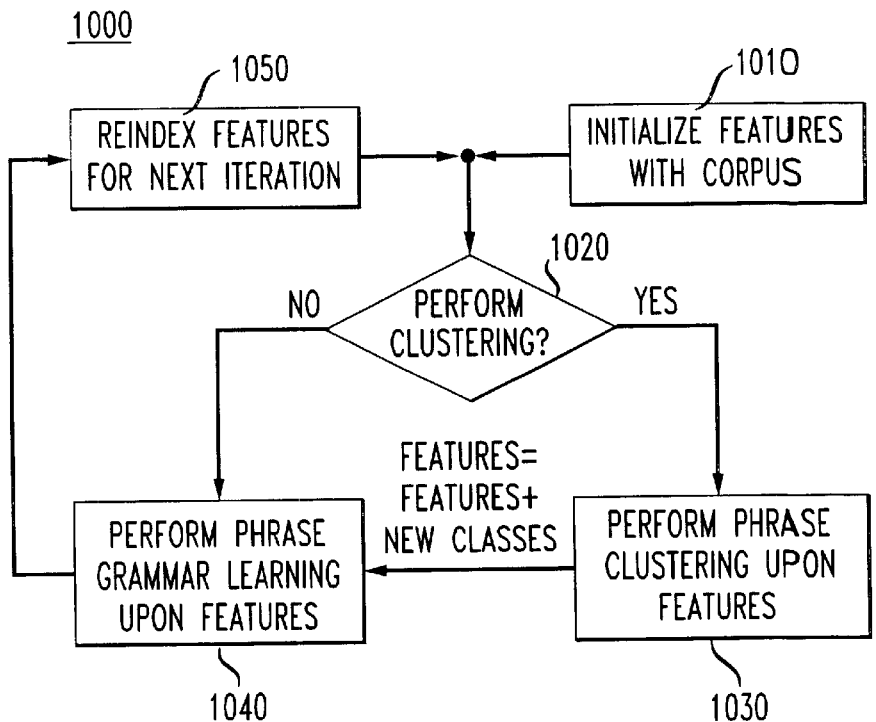
FIG. 1 illustrates a method in accordance with an embodiment of the present invention.

FIG. 1 illustrates a method 1000 of operation according to an embodiment of the present invention. The method operates on a set of "features" that initially comprises the set of words in the corpus of text (Step 1010). According to the embodiment, the method determines whether to perform phrase clustering or phrase grammar learning (Step 1020). If the method determines to perform phrase clustering, the method identifies new classes of features from the initialized set of features (Step 1030). Thereafter, if the method determines to perform phrase grammar learning at step 1020, the method performs phrase grammar learning from the features available at that step (Step 1040). Note that the features available to the phrase grammar learning step may include additional new classes if the method advances to step 1040 from step 1030. At the conclusion of step 1040, the method may re-index the set of features output from the phrase grammar learning step as the set of features for a subsequent iteration (Step 1050).

As the method 1000 operates upon the features, features can include words as well as phrases and classes. As is known, a "phrase" is a group or words and/or classes that operates as a single lexical unit and a "class" is a collection of words and/or phrases that possess similar lexical significance in the language model. The present invention builds phrases and classes from the features and integrates the phrases and classes into the set of features.

Phrase grammar learning may be performed in accordance with the techniques noted above for phrase acquisition. "Phrase grammar learning" differs from phrase acquisition in the types of inputs upon which the processing may be performed. Whereas phrase acquisition is performed typically only upon terminal symbols in a corpus (i.e. "words"), phrase grammar learning implies that the phrase acquisition techniques of the prior art are applied not only to the terminal symbols but also to non-terminal symbols such as the previously identified phrases and classes. By applying these techniques to classes, the method builds the linguistic relationships inherent in the corpus. The method builds hierarchical relationships over several iterations as a result of the construction of classes and the iterative nature of the method itself.

At step 1020, the decision to perform clustering or not may be driven by any number of cost functions. A cost function may indicate which of the two options is likely to be more advantageous toward building a language model from the present set of features. In essence, it indicates which option will result in "faster learning."

In a first embodiment, the cost function is based on an entropy variation principle. Let $V_i$ represent the whole symbol space of features at a given iteration i. The search for the optimal set of V may be designed to maximize the entropy variation $\Delta H(f)$ over a set of features $f_i = \{f_2, \ldots, f_m\}$. In $V_i$:

$$max_{f_i} \Delta H(f_i) = max_{f_i} \hat{H}_{\lambda_0}(T) - \hat{H}_{\lambda_{f_i}}(T) \quad (1)$$

$$max_{f_i} \hat{H}_{\lambda_0}(T) - \hat{H}_{\lambda_{f_i}}(T) = max_{f_i} \frac{1}{n} \log \frac{P_{\lambda_{f_i}}(T)}{P_{\lambda_0}(T)} \quad (2)$$

where $\hat{H}\lambda_{f_i}(T)$ is the entropy of the corpus T based on the phrase n-gram model $\lambda_{f_i}$ and $\lambda_0$ is the initial model. Eq. (1) follows from Eq. (2) in the sense of the law of large numbers. The search space over all possible features f in Eq. (1) is built upon the notion of phrase-ranking according to the p measure and phrase clustering rate. By varying these two parameters, one can search for the best learning strategies following the method 1000.

Other cost functions may be used. For example, the minimum distortion test described in McCandless, et al. (1993) above or the perplexity minimization test described in Kneser (1993) also above may be used as cost function indicators in Step 1020.

Phrase-grammars allow for an increased generalization power, since they can generate similar phrases that may never have been observed in a training corpus. This generalization property may be used additionally for smoothing the word probabilities in the context of stochastic language modeling for speech recognition and understanding. Standard class-based models smooth the word n-gram probability $P(w_i|w_{i-n+1}, \ldots, w_{i-1})$ in the following way:

$$P(w_i|w_{i-n+1}, \ldots, w_{i-1}) = P(C_i|C_{i-n+1}, \ldots, C_{i-1}) * P(w_i|C_i) \quad (3)$$

where $P(C_i|C_{i-n+1}, \ldots, C_{i-1})$ is the class n-gram probability and $P(w_i|C_i)$ is the class membership probability. However, phrases recognized by the same phrase-grammar can actually occur within different syntactic context but their similarity is based on their most likely lexical context. Considered in the context of Riccardi, et al. (1996) above, a context dependent training algorithm of the phrase class probabilities becomes available. In particular, $$P(w_i|w_{i-n+1}, \ldots, w_{i-1}) = P(C_i|C_{i-n+1}, \ldots, C_{i-1}; S) P(w_i|C_i; S) \quad (5)$$

where S is the state of the language model assigned by Riccardi, et al. (1996). In particular, $S=S(w_{i-n+1}, \ldots, w_{i-1}, \lambda_f)$ is determined by a word history $w_{i-n+1}, \ldots, w_{i-1}$ and the phrase-grammar model $\lambda_f$.

For example, the method 1000 has acquired the conjunction cluster {but, and, because} that leads to generate phrases like "A T and T" or "A T because T", the latter clearly an erroneous generalization. However, training context dependent probabilities in T may establish a stochastic separation between the correct and incorrect phrases:

$$\log \frac{P(A \ T \ and \ T)}{P(A \ T \ because \ T)} = 5.7 \quad (6)$$

Given a set of phrases containing terminal and non terminal symbols, the goal of large vocabulary stochastic language modeling for speech recognition and understanding is to assign a probability to all terminal symbol sequences. One of the main motivation for learning phrase-grammars is to decrease the local uncertainty in decoding spontaneous speech by embedding tightly constrained structure in the large vocabulary automaton. The language models trained on the acquired phrase-grammars give a slight improvement in perplexity (average measure of uncertainty). An other figure of merit in evaluating a stochastic language model is its local entropy $$\left( -\sum_i P(s_i|s) \log P(s_i|s) \right)$$

which is related to the notion of the branching factor of a language model state s.

The present invention provides advantages over known language building models. The order of processing permits classes to be used as a basis for phrase acquisition. The iterative nature of the processing permits phrases that are built upon classes to be clustered themselves into further classes. Thus, the present invention provides for complex linguistic models to be built from a corpus of text in a manner that is not achieved by either clustering processing or phrase acquisition processing per se.

Figure 2:
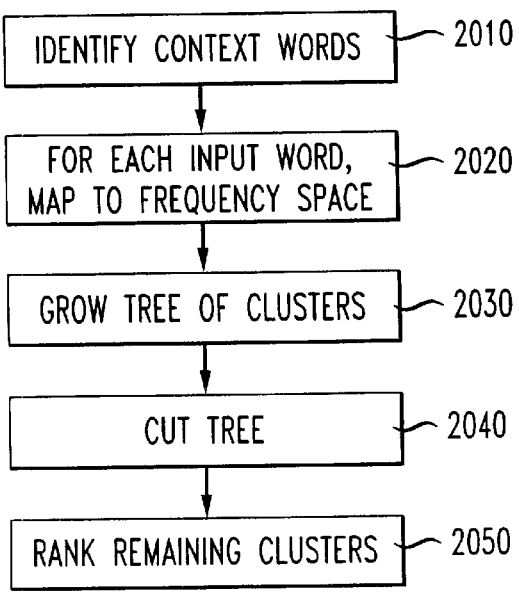
FIG. 2 is a flow diagram of a method of an embodiment of the present invention.

FIG. 2 illustrates a clustering method 2000 according to an embodiment of the present invention. The method 2000 operates upon input text, a set of symbols from which the grammar model shall be constructed. While in a first iteration, the input text may comprise a set of words or phonemes, during subsequent iterations the input text also may include non-terminal symbols such as classes, phrases and other tokens. From the input text, the method identifies context symbols (Step 2010). Context symbols are those symbols in the input text that occur with the highest frequency. The method 2000 may cause a predetermined number of symbols (say, 50) that occur with the highest frequency to be identified as context symbols.

The method 2000 determines relationships that may exist between the context symbols and the remaining symbols, called "input symbols" herein, in the input text. For example, the method 2000 may determine how many times and in which positions an input symbol appears adjacent to a context symbol. Table 1 below illustrates relationships that may exist between certain exemplary input symbols and exemplary context symbols.

TABLE 1

| Input Symbol | Context Symbol | | | | | | | | | | | |
|---|---|---|---|---|---|---|---|---|---|---|---|---|
| | to | | | | from | | | | in | | | |
| | −2 | −1 | 1 | 2 | −2 | −1 | 1 | 2 | −2 | −1 | 1 | 2 |
| Chicago | $f_{111}$ | $f_{112}$ | $f_{113}$ | $f_{114}$ | $f_{121}$ | $f_{122}$ | $f_{123}$ | $f_{124}$ | $f_{131}$ | $f_{132}$ | $f_{133}$ | $f_{134}$ |
| New York | $f_{211}$ | $f_{212}$ | $f_{213}$ | $f_{214}$ | $f_{221}$ | $f_{222}$ | $f_{223}$ | $f_{224}$ | $f_{231}$ | $f_{232}$ | $f_{233}$ | $f_{234}$ |
| Baltimore | $f_{311}$ | $f_{312}$ | $f_{313}$ | $f_{314}$ | $f_{321}$ | $f_{322}$ | $f_{323}$ | $f_{324}$ | $f_{331}$ | $f_{332}$ | $f_{333}$ | $f_{334}$ |
| red | $f_{411}$ | $f_{412}$ | $f_{413}$ | $f_{414}$ | $f_{421}$ | $f_{422}$ | $f_{423}$ | $f_{424}$ | $f_{431}$ | $f_{432}$ | $f_{433}$ | $f_{434}$ |
| white | $f_{511}$ | $f_{512}$ | $f_{513}$ | $f_{514}$ | $f_{521}$ | $f_{522}$ | $f_{523}$ | $f_{524}$ | $f_{531}$ | $f_{532}$ | $f_{533}$ | $f_{534}$ |
| blue | $f_{611}$ | $f_{612}$ | $f_{613}$ | $f_{614}$ | $f_{621}$ | $f_{622}$ | $f_{623}$ | $f_{624}$ | $f_{631}$ | $f_{632}$ | $f_{633}$ | $f_{634}$ |

Each entry of the table, $f_{ijk}$ represents, for a given input symbol i; how many times a context symbol C; and non-context symbol i; appears within a predetermined relationship. Thus $f_{111}$–$F_{1114}$ each represent the number of time the input symbol "Chicago" and the context symbol "to" appear within adjacencies of −2 symbols, −1 symbol, +1 symbol and +2 symbols respectively.

Figure 3:
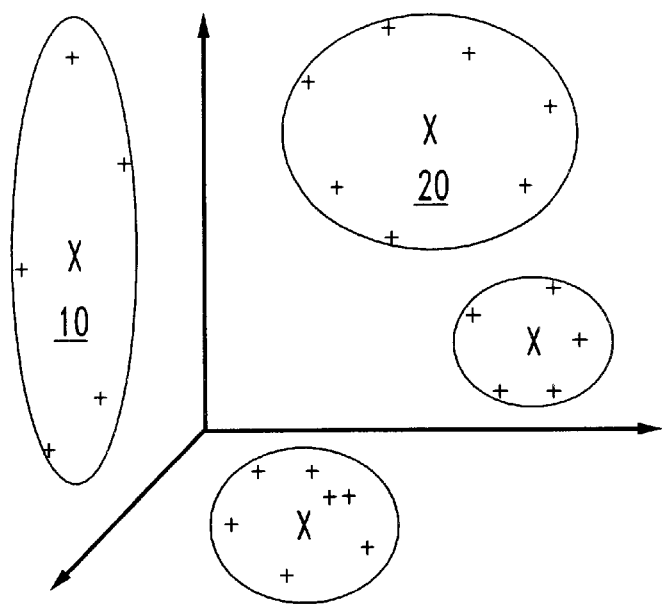
FIG. 3 illustrates mapping frequency vectors that may be obtained during operation of the present invention.

Based upon the frequencies, an N dimensional vector may be built for each input symbol (step 2020). The number of dimensions N of the frequency vector is a multiple of the total number of context symbols, the total number of input symbols and the total number of relations identified by the method 2000 The vector represents grammatical links that exist between the input symbols and the context symbols. Thus, each input symbol maps to an N dimensional frequency space. A representative frequency space is shown in FIG. 3 (N=3).

The method 2000 builds clusters of input symbols (Step 2030). According to the principles of the present invention, input symbols having the same lexical significance should possess similar vectors in the frequency space. Thus, it is expected that city names will exhibit frequency characteristics that are similar to each other but different from other input symbols having a different lexical significance. They will be included in a cluster (say, cluster 10, FIG. 3). So, too, with colors. They will be included in another cluster (say, cluster 20). Where symbols exhibit similar frequency significance, they are included within a single cluster.

As is known, a cluster may be represented in an N-dimensional frequency space by a centroid coordinate and a radius indicating the volume of the cluster. The radius indicates the "compactness" of the elements within a cluster. Where a cluster has a small radius, it indicates that the elements therein exhibit a very close relationship to each other in the frequency space. A larger radius indicates less similarities between elements in the frequency space.

The similarity between two symbols may be measured using the Manhattan distance metric between their feature vectors. Manhattan distance is based on the sum of the absolute value of the differences among the vector's coordinates. Alternatively, Euclidean and maximum metrics may be used to measure distances. Experimentally, the Manhattan distance metric was shown to provide better results than the Euclidean or maximum distance metrics.

Step 2030 may be applied recursively to grow clusters from clusters. That is, when two clusters are located close to one another in the N dimensional space, the method 2000 may enclose them in a single cluster having its own centroid and radius. The method 2000 determines a distance between two clusters by determining the distance between their centroids using one of the metrics discussed above with respect to the vectors of input symbols. Thus, the Manhattan, Euclidean and maximum distance metrics may be used.

Figure 4:
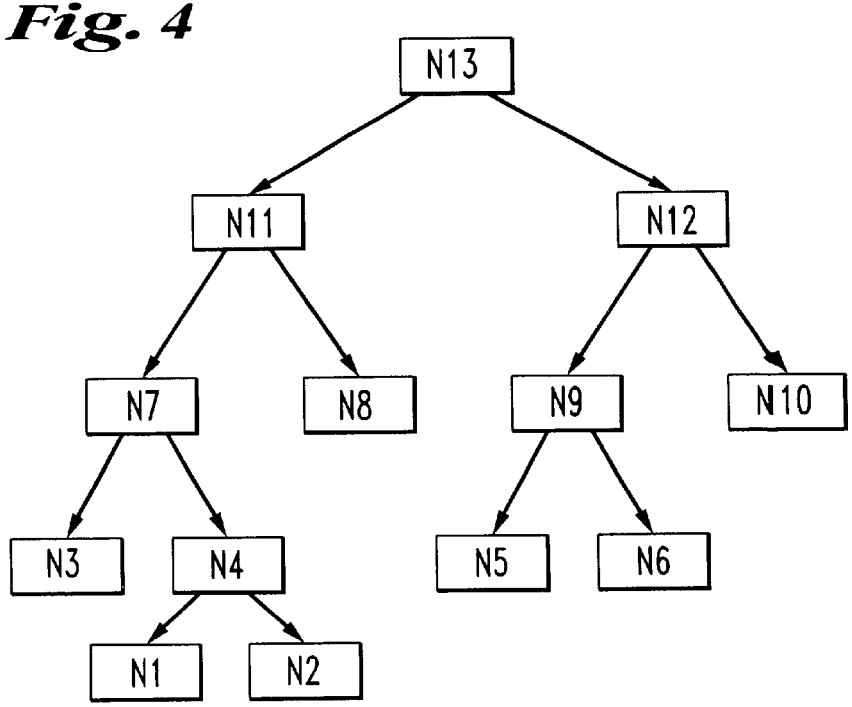
FIG. 4 illustrates an exemplary cluster tree.

A hierarchical "cluster tree" is grown representing a hierarchy of the clusters. At one node in the tree, the centroid and radius of a first cluster is stored. Two branches extend from the node to other nodes where the centroids and radii of subsumed clusters are stored. Thus, the tree structure maintains the centroid and radius of every cluster built according to Step 2030. Step 2030 recurs until a single, all encompassing cluster encloses all clusters and input symbols. This cluster is termed the "root cluster" because stored as the root node of the cluster tree. An exemplary cluster tree is shown in FIG. 4.

As will be appreciated, the root cluster N13 has a radius large enough to enclose all clusters and input symbols. The root cluster, therefore, possesses very little lexical significance. By contrast, "leaf clusters," those provided at the ends of branches in the cluster tree, possess very strong lexical significance.

At Step 2040, the method 2000 cuts the cluster tree along a predetermined line in the tree structure. The cutting line separates large clusters from smaller clusters. The large clusters are discarded. What remains are smaller clusters, those with greater lexical significance.

The cutting line determines the number of clusters that will remain. One may use the median of the distances between clusters merged at the successive stages as a basis for the cutting line and prune the cluster tree at the point where cluster distances exceed this median value. Clusters are defined by the structure of the tree above the cutoff point.

Finally, the method 2000 ranks the remaining clusters (Step 2050). The lexical significance of a particular cluster is measured by its compactness value. The compactness value of a cluster simply may be its radius or an average distance of the members of the cluster from the centroid of the cluster. Thus, the tighter clusters exhibiting greater lexical significance will occur first in the ranked list of clusters and those exhibiting lesser lexical significance will occur later in the list. The list of clusters obtained from Step 2050 is a grammatical model of the input text.

The method 2000 is general in that it can be used to either cluster "tokens" at any lexical level. For example, it may be applied to symbols and/or phrases. Table 2 illustrates the result of clustering symbols and Table 3 illustrates the result of clustering phrases as performed on an experimental set of training data taken from the How May I Help You? Training corpus disclosed in Gorin, et al., "How May I Help You?," vol. 23, Speech Communication, pp. 113–127 (1997). Other lexical granularities (syllables, phonemes) also may be used.

TABLE 2

Results of Clustering Symbols from AT&T's How May I Help You? Corpus

| Class Index | Compactness Value | Class Members |
|---|---|---|
| C363 | 0.131 | make place |
| C118 | 0.18 | eight eighty five four nine oh one seven six three two zero |
| C357 | 0.19 | bill charge |
| C260 | 0.216 | an and because but so when |
| C300 | 0.233 | K O ok |
| C301 | 0.236 | from please |
| C277 | 0.241 | again here |
| C202 | 0.252 | as it's |
| C204 | 0.263 | different third |
| C77 | 0.268 | number numbers |
| C275 | 0.272 | need needed want wanted |
| C256 | 0.274 | assistance directory information |
| C197 | 0.278 | all before happened |
| C68 | 0.278 | ninety sixty |
| C41 | 0.29 | his our the their |
| C199 | 0.291 | called dialed got have |
| C27 | 0.296 | as by in no not now of or something that that's there whatever working |
| C327 | 0.296 | I I'm I've |
| C48 | 0.299 | canada england france germany israel italy japan london mexico paris |
| C69 | 0.308 | back direct out through |
| C143 | 0.312 | connected going it |
| C89 | 0.314 | arizona california carolina florida georgia illinois island jersey maryland michigan missouri ohio pennsylvania virginia west york |
| C23 | 0.323 | be either go see somebody them |
| C90 | 0.332 | about me off some up you |

TABLE 3

Results from a First Iteration of Combining Phrase Acquisition and Clustering from the How May I Help You? Corpus [Symbols in a Phrase are Separated by a Colon].

| Class Index | Compactness Value | Class Members |
|---|---|---|
| D365 | 0.226 | wrong:C77 second |
| D325 | 0.232 | C256:C256 C256 |
| D380 | 0.239 | area:code:C118:C118:C118:C118:C118 C68 |
| D386 | 0.243 | A:C77 this:C77 |
| D382 | 0.276 | C260:C357:C143:to:another C260:C357:C143:to:my:home |
| D288 | 0.281 | C327:C275:to:C363 I'd:like:toC363 to:363 yes:I'd:like:to:C363 |
| D186 | 0.288 | good:morning yes:ma'am yes:operator hello hi ma'am may well |
| D148 | 0.315 | problems trouble |
| D87 | 0.315 | A:T:C260:T C260:C327 C27:C27 C41 :C77 C118 C143 C260 C197 C199 C202 C23 C260 C27 C277 C301 C69 C77 C90 operator to |
| D183 | 0.321 | C118:C118:hundred C204 telephone |
| D143 | 0.326 | new:C89 C48 C89 colorado massachusetts tennessee texas |
| D387 | 0.327 | my:home my:home:phone |
| D4 | 0.336 | my:calling my:calling:card my:card |
| D70 | 0.338 | C199:a:wrong:C77 misdialed |
| D383 | 0.341 | like:to:C363 trying:to:C363 would:like:to:C363 |
| D381 | 0.347 | like:to:C363:a:collect:call:to |

TABLE 3-continued

Results from a First Iteration of Combining Phrase Acquisition and Clustering from the How May I Help You? Corpus [Symbols in a Phrase are Separated by a Colon].

| Class Index | Compactness Value | Class Members |
|---|---|---|
| | | like:to:C363:collect:call |
| | | would:like:to:C363:a:collect:call |
| | | would:like:to:C363:a:collect:call |
| | | would:like:to:C363:a:collect:call:to |
| D159 | 0.347 | C118:C118 C118:C118:C118 C118:C118: C118:C118:C118:C118 C118:C118:C118: C118:C118:C118:C118 C118:C118:C118: C118:C118:C118:C118:C118:C118:C118: C118:C118:C118:C118:C118:C118:C118: C118:C118:C118:C118 area:code:C118:C118: C118 C300 |

Adjacency of symbols is but one relationship that the method 2000 may be applied to recognize from a corpus. More generally, however, the method 2000 may be used to recognize predetermined relationships among tokens of the corpus. For example, the method 2000 can be configured to recognize symbols that appear together in the same sentences or symbols that appear within predetermined positional relationships with punctuation. Taken even further, the method 2000 may be configured to recognize predetermined grammatical constructs of language, such as subjects and/or objects of verbs. Each of these latter examples of relationships may require that the method be pre-configured to recognize the grammatical constructs.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of building a linguistic model from a corpus of features, comprising:

determining whether to perform clustering based upon a cost function $$\max_{f_i} \Delta H(f_i) = \max_{f_i} \hat{H}_{\lambda_0}(T) - \hat{H}_{\lambda_{fi}}(T)$$

where $\hat{H}_{\lambda_{fi}}(T)$ represents the entropy of the corpus T based on a phrase n-gram model for a feature $f_i$, and $\hat{H}_{\lambda_0}$ represents an initial entropy of the corpus;

if so, clustering upon the features into classes;

thereafter, performing phrase acquisition upon the features and the classes; and storing the acquired phrases in a computer readable medium.

2. A method of building a linguistic model from a corpus of features, comprising:

determining whether to perform clustering based upon a predetermined cost function;

if so, clustering upon the features into classes;

thereafter, performing phrase acquisition upon the features and the classes; and storing the acquired phrases in a computer readable medium;

wherein the clustering step comprises:

identifying context symbols within the features,
for each non-context symbol in the features, counting occurrences of predetermined relationships between the non-context symbol and a context symbol,
generating frequency vectors for each non-context symbol based upon the counted occurrences, and
clustering non-context symbols based upon the frequency vectors.

3. The method of claim 2, wherein the clustering is performed based on Euclidean distances between frequency vectors.

4. The method of claim 2, wherein the clustering is performed based on Manhattan distances between frequency vectors.

5. The method of claim 2, wherein the clustering is performed based on maximum distance metrics between frequency vectors.

6. The method of claim 2, wherein the frequency vectors of a non-context symbol is normalized based upon the number of occurrences of the non-context symbol in the features.

7. The method of claim 2, wherein the frequency vectors are multi dimensional vectors, the number of dimensions determined by the number of context symbols and different levels of adjacency identified in the counting step.

8. The method of claim 2, wherein clusters may be represented by a centroid vector.

9. A method of building a linguistic model from a set of features, the features initially constituting text from an input corpus, comprising:

applying a cost function to the set of features, the cost function defined by $$\max_{f_i} \Delta H(f_i) = \max_{f_i} \hat{H}_{\lambda_0}(T) - \hat{H}_{\lambda_{f_i}}(T)$$

where $\hat{H}_{\lambda_{f_i}}(T)$ represents the entropy of the corpus T based on a phrase n-gram model for a feature $f_i$, and $\hat{H}_{\lambda_0}$ represents an initial entropy of the corpus;

based upon the results of the cost function, performing clustering on the set of features, the clustering resulting in classes that are included in the set of features;

performing phrase acquisition on the set of features; and storing the acquired phrases in a computer readable medium.

10. A method of building a linguistic model from a set of features, the features initially constituting text from an input corpus, comprising:

applying a cost function to the set of features, based upon the results of the cost function, performing clustering on the set of features, the clustering resulting in classes that are included in the set of features;

performing phrase acquisition on the set of features; and storing the acquired phrases in a computer readable medium;

wherein the clustering step comprises:
identifying context tokens within the set of features,
for each non-context token in the set of features, counting occurrences of predetermined relationships between the non-context token and a context token,
generating frequency vectors for each non-context token based upon the counted occurrences, and
clustering non-context tokens based upon the frequency vectors.

11. The method of claim 10, wherein the clustering is performed based on Euclidean distances between frequency vectors.

12. The method of claim 10, wherein the clustering is performed based on Manhattan distances between frequency vectors.

13. The method of claim 10, wherein the clustering is performed based on maximum distance metrics between frequency vectors.

14. The method of claim 10, wherein the frequency vectors of a non-context token is normalized based upon the number of occurrences of the non-context token in the set of features.

15. The method of claim 10, wherein the frequency vectors are multi dimensional vectors, the number of dimensions determined by the number of context tokens and different level of adjacency identified in the counting step.

16. The method of claim 10, wherein clusters may be represented by a centroid vector.

17. A method of building a linguistic model from a corpus, comprising:

initializing a set of features based upon the corpus, iteratively:
determining, based upon a predetermined cost function, whether to perform clustering upon the set of features and, if so, performing clustering on the set of features to identify classes therefrom,
performing phrase acquisition on the set of features and any classes that exist to obtain phrases therefrom,
re-initializing the set of features for a subsequent iteration to include the set of features, the classes and the phrases; and
storing the set of features, the classes, and the phrases in a computer readable medium;
wherein the cost function is:

$$\max_{f_i} \Delta H(f_i) = \max_{f_i} \hat{H}_{\lambda_0}(T) - \hat{H}_{80_{f_i}}(T)$$

where $\hat{H}_{\lambda_{f_i}}(T)$ represents the entropy of the corpus T based on a phrase n-gram model for a feature $f_i$, and $\hat{H}_{\lambda_{di}\ 0}$ represents an initial entropy of the corpus.

18. A method of building a linguistic model from a corpus, comprising:

initializing a set of features based upon the corpus, iteratively:
determining, based upon a predetermined cost function, whether to perform clustering upon the set of features and, if so, performing clustering on the set of features to identify classes therefrom,
performing phrase acquisition on the set of features and any classes that exist to obtain phrases therefrom,
re-initializing the set of features for a subsequent iteration to include the set of features, the classes and the phrases; and
storing the set of features, the classes, and the phrases in a computer readable medium;
wherein the clustering step comprises:
identifying context tokens within the set of features,
for each non-context token in the set of features, counting occurrences of predetermined relationships between the non-context token and a context token,
generating frequency vectors for each non-context token based upon the counted occurrences, and
clustering non-context tokens based upon the frequency vectors.

19. The method of claim 18, wherein the clustering is performed based on Euclidean distances between frequency vectors.

20. The method of claim 18, wherein the clustering is performed based on Manhattan distances between frequency vectors.

21. The method of claim 18, wherein the clustering is performed based on maximum distance metrics between frequency vectors.

22. The method of claim 18, wherein the frequency vectors of a non-context token is normalized based upon the number of occurrences of the non-context token in the set of features.

23. The method of claim 18, wherein the frequency vectors are multi dimensional vectors, the number of dimensions determined by the number of context tokens and different level of adjacency identified in the counting step.

24. The method of claim 18, wherein clusters may be represented by a centroid vector.

25. A machine-readable medium having stored thereon executable instructions that when executed by a processor, cause the processor to build a linguistic model from a corpus of features by:

determining whether to perform clustering based upon a cost function $$\max_{f_i}\Delta H(f_i)=\max_{f_i}\hat{H}_{\lambda_0}(T)-\hat{H}_{\lambda_{f_i}}(T)$$

where $\hat{H}_{\lambda_{f_i}}(T)$ represents the entropy of the corpus T based on a phrase n-gram model for a feature $f_i$, and $\hat{H}_{\lambda_0}$ represents an initial entropy of the corpus;

based upon the results of the cost function, clustering the features into classes;

thereafter, performing phrase acquisition upon the features and the classes; and storing the acquired phrases in a computer readable medium.

26. A machine-readable medium having stored thereon executable instructions that when executed by a processor, cause the processor to build a linguistic model from a corpus of features, by:

determining whether to perform clustering based upon a predetermined cost function;

if so, clustering upon the features into classes;

thereafter, performing phrase acquisition upon the features and the classes; and storing the acquired phrases in a computer readable medium;

wherein the clustering step comprises:
identifying context symbols within the features,
for each non-context symbol in the features, counting occurrences of predetermined relationships between the non-context symbol and a context symbol,
generating frequency vectors for each non-context symbol based upon the counted occurrences, and
clustering non-context symbols based upon the frequency vectors.

27. A machine-readable medium having stored thereon a linguistic model generated from a corpus of features according to the process of:

determining whether to perform clustering based upon a cost function $$\max_{f_i}\Delta H(f_i)=\max_{f_i}\hat{H}_{\lambda_0}(T)-\hat{H}_{\lambda_{f_i}}(T)$$

where $\hat{H}_{\lambda_{f_i}}(T)$ represents the entropy of the corpus T based on a phrase n-gram model for a feature $f_i$, and $\hat{H}_{\lambda_0}$ represents an initial entropy of the corpus;

based upon the results of the cost function, clustering the features into classes;

thereafter, performing phrase acquisition upon the features and the classes; and storing the acquired phrases in a computer readable medium.

28. A machine-readable medium having stored thereon a linguistic model generated from a corpus of features according to the process of:

determining whether to perform clustering based upon a predetermined cost function;

if so, clustering upon the features into classes;

thereafter, performing phrase acquisition upon the features and the classes; and storing the acquired phrases in a computer readable medium;

wherein the clustering step comprises:
identifying context symbols within the features,
for each non-context symbol in the features, counting occurrences of predetermined relationships between the non-context symbol and a context symbol,
generating frequency vectors for each non-context symbol based upon the counted occurrences, and
clustering non-context symbols based upon the frequency vectors.

* * * * *

UNITED STATES PATENT AND TRADEMARK OFFICE
CERTIFICATE OF CORRECTION

PATENT NO. : 6,415,248 B1
DATED : July 2, 2002
INVENTOR(S) : Bangalore et al.

It is certified that error appears in the above-identified patent and that said Letters Patent is hereby corrected as shown below:

<u>Title page,</u>
Item [57], ABSTRACT,
Line 11, change "is re-indexed" to -- are re-indexed --.

<u>Column 4,</u>
Line 11, change "leads to generate" to -- leads to generated --.

<u>Column 5,</u>
Line 25, change "F1114" to -- F114 --.

<u>Column 6,</u>
Line 17, change "$f_{f33}$" to -- $f_{533}$ --.

<u>Column 9,</u>
Line 20, change "is" to -- are --.

<u>Column 10,</u>
Line 39, change "$\hat{H}_{80f_i}(T)$" to -- $\hat{H}_{\lambda f_i}(T)$ --.

Line 42, change "$\hat{H}_{\lambda di\ 0}$" to -- $\hat{H}_{\lambda_0}$ --.

Signed and Sealed this

Nineteenth Day of November, 2002

*Attest:*

JAMES E. ROGAN
*Director of the United States Patent and Trademark Office*

*Attesting Officer*